United States Patent
Lin et al.

(10) Patent No.: US 11,212,483 B2
(45) Date of Patent: Dec. 28, 2021

(54) SYSTEMS AND METHODS FOR EVENT-BASED PLAYBACK CONTROL DURING VIRTUAL APPLICATION OF MAKEUP EFFECTS

(71) Applicant: Perfect Mobile Corp., New Taipei (TW)

(72) Inventors: Kuo-Sheng Lin, New Taipei (TW); Wei-Hsin Tsen, New Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 0 days.

(21) Appl. No.: 17/171,230

(22) Filed: Feb. 9, 2021

(65) Prior Publication Data

US 2021/0258534 A1    Aug. 19, 2021

Related U.S. Application Data

(60) Provisional application No. 62/977,068, filed on Feb. 14, 2020.

(51) Int. Cl.
*H04N 5/77* (2006.01)
*G06F 3/01* (2006.01)
(Continued)

(52) U.S. Cl.
CPC .............. *H04N 5/77* (2013.01); *G06F 3/017* (2013.01); *G06K 9/00335* (2013.01);
(Continued)

(58) Field of Classification Search
CPC .......... G06K 9/00711; G06K 9/00335; G06K 2009/00738; H04N 5/77; H04N 5/772;
(Continued)

(56) References Cited

U.S. PATENT DOCUMENTS 8,899,242 B2    12/2014  Wong
9,007,301 B1    4/2015   Raffle et al.
(Continued)

FOREIGN PATENT DOCUMENTS

CN    106682958 A    5/2017
JP    04623044 A     2/2011
(Continued)

OTHER PUBLICATIONS

"Mirror, Mirror On The Wall: L'Oréal's ModiFace Uses AI To Find Your Perfect Shade Match;" Nov. 13, 2018; pp. 1-10.
(Continued)

*Primary Examiner* — Robert Chevalier
(74) *Attorney, Agent, or Firm* — McClure, Qualey & Rodack, LLP

(57) ABSTRACT

A computing device obtains a live video of a user and obtains selection of at least one makeup effect. The computing device generates a user interface displaying the live video in a virtual mirror with the at least one makeup effect applied to a facial region of the user and monitors for an occurrence of a first target event relating to actions by the user in the live video. In response to detecting an occurrence of the first target event during the live video, the computing device records the live video based on the occurrence of the first target event, detects an occurrence of a second target event relating to actions by the user, and stops recording of the video responsive to occurrence of the second target event.

23 Claims, 7 Drawing Sheets

(51) Int. Cl.
*G06K 9/00* (2006.01)
*H04N 9/87* (2006.01)

(52) U.S. Cl.
CPC ............ *G06K 9/00711* (2013.01); *H04N 9/87* (2013.01); *G06K 2009/00738* (2013.01)

(58) Field of Classification Search
CPC .......... H04N 7/183; H04N 9/87; G06F 3/017; A45D 44/005
USPC ................ 386/224, 228, 225, 227, 230, 248
See application file for complete search history.

(56) References Cited

U.S. PATENT DOCUMENTS

| | | | |
|---|---|---|---|
| 9,603,437 B2 | 3/2017 | Nguyen et al. | |
| 10,324,739 B2 | 6/2019 | Chou et al. | |
| 10,395,436 B1 | 8/2019 | Li et al. | |
| 10,431,010 B2 | 10/2019 | Yang et al. | |
| 2014/0016823 A1 | 1/2014 | Ye et al. | |
| 2015/0208125 A1 | 7/2015 | Robinson | |
| 2016/0127710 A1 | 5/2016 | Saban et al. | |
| 2018/0075524 A1 | 3/2018 | Sartori et al. | |
| 2018/0095635 A1 | 4/2018 | Valdivia et al. | |
| 2018/0278879 A1 | 9/2018 | Saban et al. | |
| 2019/0059561 A1 | 2/2019 | Shen et al. | |
| 2019/0122045 A1* | 4/2019 | Ravi | G06K 9/00228 |
| 2019/0166980 A1 | 6/2019 | Huang et al. | |
| 2019/0244015 A1 | 8/2019 | Lee | |
| 2019/0244260 A1 | 8/2019 | Lin et al. | |
| 2019/0246065 A1 | 8/2019 | Lee et al. | |
| 2019/0251754 A1* | 8/2019 | Yang | G06T 7/73 |
| 2020/0245019 A1* | 7/2020 | Yin | A63F 13/355 |

FOREIGN PATENT DOCUMENTS

| | | |
|---|---|---|
| WO | 2006/097638 A1 | 9/2006 |
| WO | 2017/108699 A1 | 6/2017 |

OTHER PUBLICATIONS

"New gesture-control app: Look away to pause your video, "shhh" it to shut it up;" Apr. 2013; pp. 1-4.
"Sephora 3D Augmented Reality Mirror;" YouTube tutorial; https://www.youtube.com/watch?reload=9&v=2dTvMR7TVck; pp. 1.
"Sephora Introduces Augmented Reality App Virtual Artist;" YouTube tutorial; https://www.youtube.com/watch?v=5qpuym4-JDE; pp. 1.
"Get The Look;" https://www.rimmellondon.com/en-us/about; https://www.rimmellondon.com/en_us/get-the-app; pp. 1-5.
Stolyar, B.; "MAC Virtual Try-on Mirror review;" https://www.digitaltrends.com/photography/mac-virtual-try-on-mirror-review/; pp. 1-10.
"ActiMirror Virtual Makeup—Smart Mirrors;" YouTube tutorial; https://www.youtube.com/watch?v=Qg5V2s1BC7I; pp. 1.
Extended European Search Report dated Apr. 23, 2021, issued in application No. EP 21156848.0.

* cited by examiner

SYSTEMS AND METHODS FOR EVENT-BASED PLAYBACK CONTROL DURING VIRTUAL APPLICATION OF MAKEUP EFFECTS

CROSS-REFERENCE TO RELATED APPLICATION

This application claims priority to, and the benefit of, U.S. Provisional Patent Application entitled, "To let users view their eye cosmetic effects while closing eyes," having Ser. No. 62/977,068, filed on Feb. 14, 2020, which is incorporated by reference in its entirety.

TECHNICAL FIELD

The present disclosure relates to systems and methods for performing event-based playback control during the virtual application of makeup effects.

BACKGROUND

There is a need for an improved system and method for allowing users to fully experience virtual application of makeup effects.

SUMMARY

In accordance with one embodiment, a computing device obtains a live video of a user, wherein the live video comprises a plurality of image frames of the user. The computing device obtains selection of at least one makeup effect and generates a user interface displaying the live video in a virtual mirror with the at least one makeup effect applied to a facial region of the user. The computing device monitors for an occurrence of a first target event relating to actions by the user in the live video, wherein the first target event comprises one or both eyes of the user being closed, a head of the user being turned sideways with respect to a front facing camera of the computing device, and/or the eyes of the user moving outside a field of view of the front facing camera. Responsive to detecting an occurrence of the first target event during the live video, the computing device records the live video based on the occurrence of the first target event, detects an occurrence of a second target event relating to actions by the user, and stops recording of the live video responsive to the occurrence of the second target event.

In another embodiment, a computing device obtains a live video of a user, where the live video comprises a plurality of image frames of the user. The computing device obtains selection of at least one makeup effect and generates a user interface displaying the live video in a virtual mirror with the at least one makeup effect applied to a facial region of the user. The computing device monitors for an occurrence of a first target event relating to actions by the user in the live video, wherein the first target event comprises one or both eyes of the user being closed, a head of the user being turned sideways with respect to a front facing camera of the computing device, and/or the eyes of the user moving outside a field of view of the front facing camera. Responsive to detecting an occurrence of the first target event during the live video, the computing device displays a static image with the at least one makeup effect applied to the facial region of the user, wherein the static image is selected from one of the plurality of image frames of the live video after the occurrence of the first target event.

Another embodiment is a system that comprises a memory storing instructions and a processor coupled to the memory. The processor is configured by the instructions to obtain selection of at least one makeup effect and generate a user interface displaying the live video in a virtual mirror with the at least one makeup effect applied to a facial region of the user. The processor is further configured to monitor for an occurrence of a first target event relating to actions by the user in the live video, wherein the first target event comprises one or both eyes of the user being closed, a head of the user being turned sideways with respect to a front facing camera of the system, and/or the eyes of the user moving outside a field of view of the front facing camera. Responsive to detecting an occurrence of the first target event during the live video, the processor is further configured to record the live video based on the occurrence of the first target event, monitor for an occurrence of a second target event relating to actions by the user, and stop recording of the live video instance responsive to occurrence of the second target event.

Another embodiment is a system that comprises a memory storing instructions and a processor coupled to the memory. The processor is configured by the instructions to obtain a live video of a user, where the live video comprises a plurality of image frames of the user. The processor is further configured to obtain selection of at least one makeup effect and generates a user interface displaying the live video in a virtual mirror with the at least one makeup effect applied to a facial region of the user. The processor is further configured to monitor for an occurrence of a first target event relating to actions by the user in the live video, wherein the first target event comprises one or both eyes of the user being closed, a head of the user being turned sideways with respect to a front facing camera of the system, and/or the eyes of the user moving outside a field of view of the front facing camera. Responsive to detecting an occurrence of the first target event during the live video, the processor is further configured to display a static image with the at least one makeup effect applied to the facial region of the user, wherein the static image is selected from one of the plurality of image frames of the live video after the occurrence of the first target event.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Figure 1:
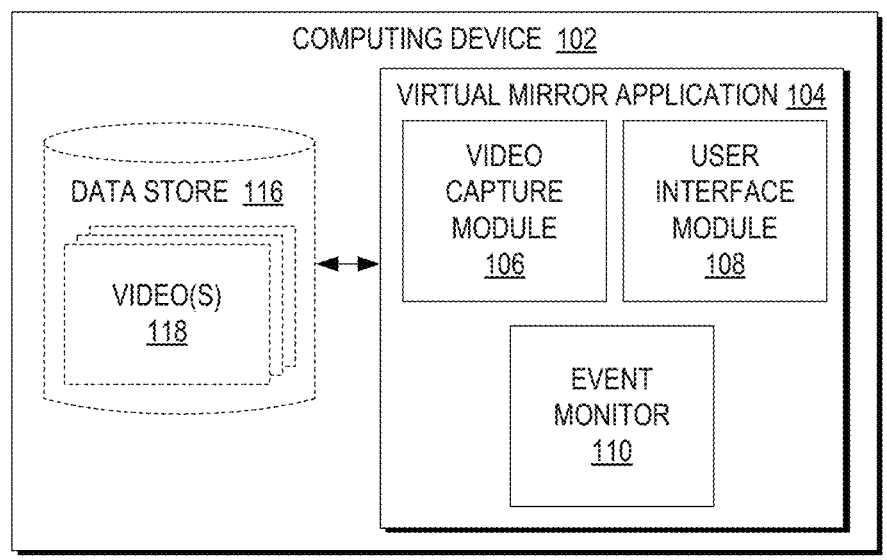
FIG. 1 is a block diagram of a computing device for performing event-based playback control during virtual application of makeup effects according to various embodiments of the present disclosure.

A description of a system for performing event-based playback control during virtual application of makeup effects is described followed by a discussion of the operation of the components within the system. FIG. 1 is a block diagram of a computing device 102 in which the embodiments disclosed herein may be implemented. The computing device 102 may be embodied as a computing device such as, but not limited to, a smartphone, a tablet computing device, a laptop, and so on. A virtual mirror application 104 executes on a processor of the computing device 102 and includes a video capture module 106, a user interface module 108, and an event monitor 110.

The video capture module 106 is configured to obtain a live video of the user and obtain a selection of one or more makeup effects to be applied to a facial region of the user. As described in more detail below, the video capture module 106 is further configured to capture and store a video 118 of the user with makeup effects in a data store 116 in the computing device 102, where the capturing and storing of the video 118 is triggered based on the occurrence of certain target events.

The video 118 stored in the data store 116 may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The user interface module 108 is configured to generate a user interface for displaying playback of the live video in a virtual mirror where the virtual mirror allows the user to experience the simulated application of one or more selected makeup effects applied to the facial region of the user. The event monitor 110 is configured to monitor the actions by the user in the live video and compare the actions of the user to one or more predefined target events. In particular, the event monitor 110 monitors for an occurrence of a first target event relating to actions by the user in the live video, where the first target event comprises one or both eyes of the user being closed, a head of the user being turned sideways with respect to a front facing camera of the computing device, and/or the eyes of the user moving outside a field of view of the front facing camera.

Responsive to detecting an occurrence of the first target event during the live video, the video capture module 106 records the live video based on the occurrence of the first target event, and the event monitor 110 monitors for an occurrence of a second target event relating to actions by the user. The video capture module 106 stops recording of the live video responsive to the occurrence of the second target event.

In accordance with an alternative embodiment, the video capture module 106 is configured to obtain a live video of the user and obtain a selection of one or more makeup effects to be applied to a facial region of the user. The user interface module 108 is configured to generate a user interface for displaying playback of the live video in a virtual mirror where the virtual mirror allows the user to experience the simulated application of one or more selected makeup effects applied to the facial region of the user.

The event monitor 110 is configured to monitor the actions by the user in the live video and compare the actions of the user to one or more predefined target events. In particular, the event monitor 110 monitors for an occurrence of a first target event relating to actions by the user in the live video, where the first target event comprises one or both eyes of the user being closed, a head of the user being turned sideways with respect to a front facing camera of the computing device, and/or the eyes of the user moving outside a field of view of the front facing camera. Responsive to the event monitor 110 detecting an occurrence of the first target event during the live video, the user interface module 108 displays a static image with the at least one makeup effect, where the static image is selected from one of the plurality of image frames of the live video after the occurrence of the first target event.

By recording the live video based on the occurrence of target events and then allowing the user to control when to initiate playback of the recorded video, the user is able to fully experience virtual application of the one or more selected makeup effects even when the user is not looking directly at the virtual mirror. In particular, this improved system allows the user to turn her head to varying positions including those where the user is not looking directly at the computing device 102, thereby allowing the user to fully experience the virtual application of various makeup effects during various poses. This feature is particularly useful, for example, when the user closes her eyes and later wishes to see how the application of a particular eye shadow appears on her face.

Figure 2:
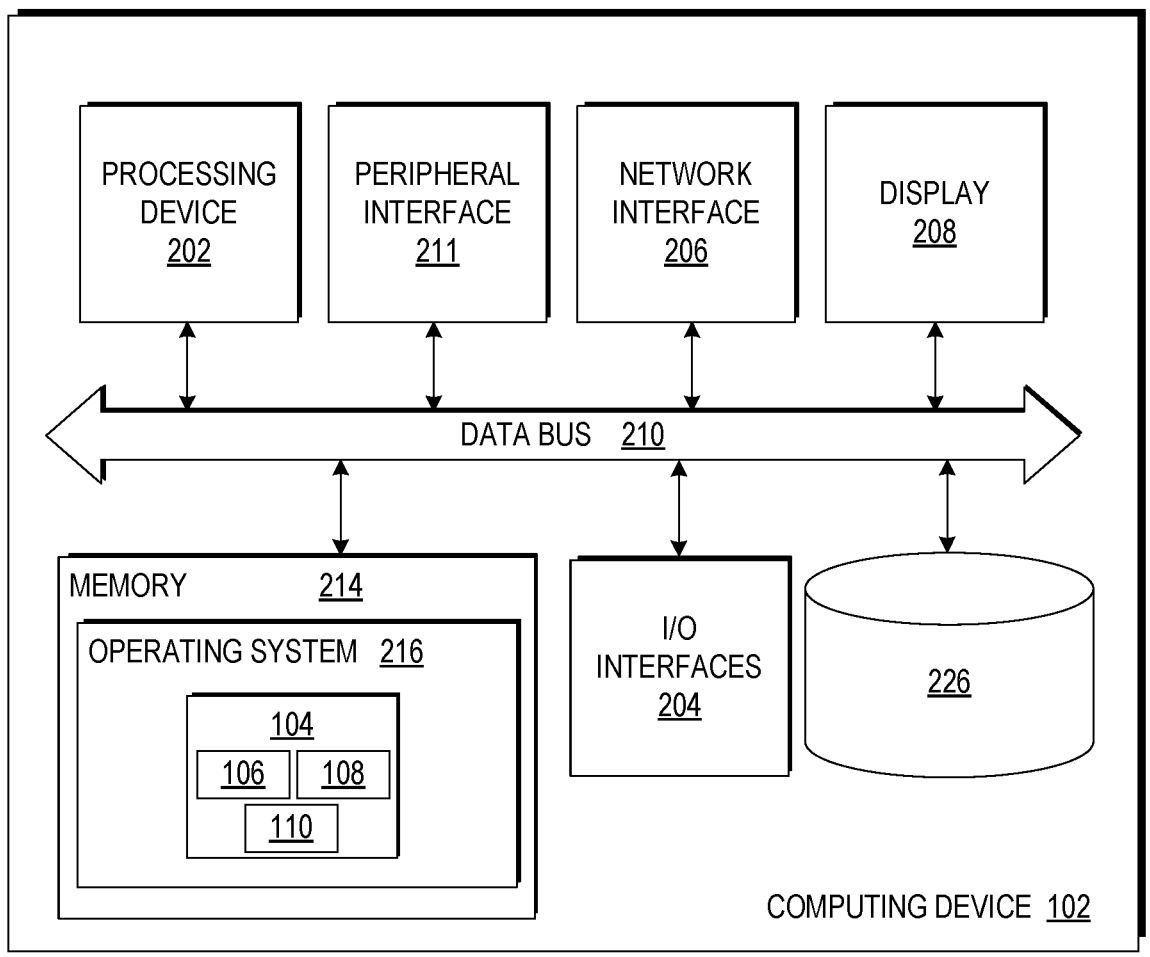
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
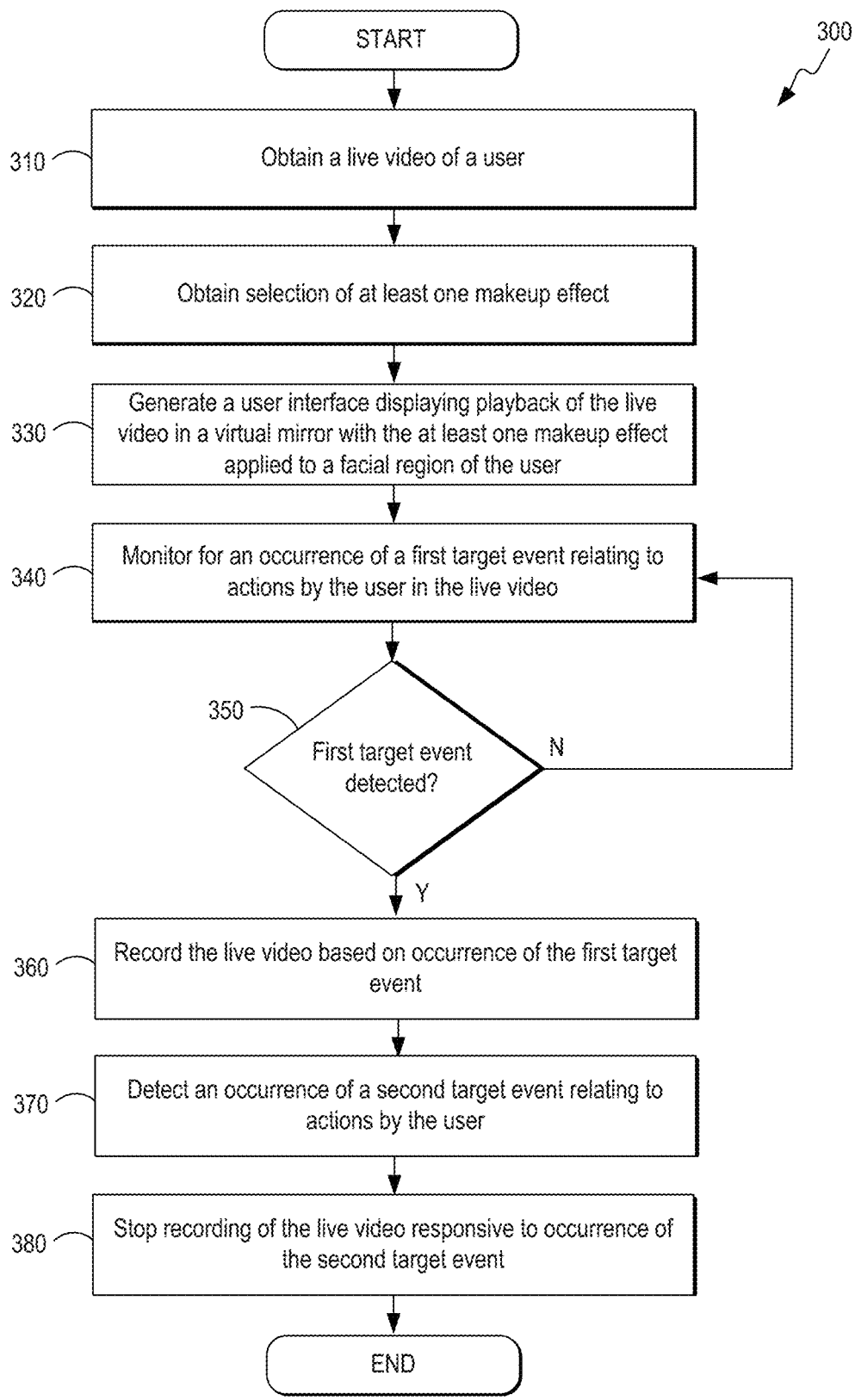
FIG. 3 is a top-level flowchart illustrating examples of functionality implemented as portions of the computing device of FIG. 1 for performing event-based playback control during virtual application of makeup effects according to various embodiments of the present disclosure.

Reference is made to FIG. 3, which is a flowchart 300 in accordance with various embodiments for event-based playback control during virtual application of makeup effects performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains a live video of a user. At block 320, the computing device 102 obtains selection of at least one makeup effect. At block 330, the computing device 102 generates a user interface displaying playback of the live video in a virtual mirror with the at least one makeup effect applied to the facial region of the user. At block 340, the computing device 102 monitors for an occurrence of a first target event relating to actions by the user in the live video, where the first target event comprises one or both eyes of the user being closed, a head of the user being turned sideways with respect to a front facing camera of the computing device, and/or the eyes of the user moving outside a field of view of the front facing camera.

At decision block 350, if the first target event has not been detected, the computing device 102 continues to monitor the actions by the user in the live video (block 340). However, if the computing device 102 detects that the first target event has occurred, the computing device 102 records the live video based on the occurrence of the first target event (block 360). For some embodiments, recording of the live video begins at a time instance in which the first target event occurred. For other embodiments, recording of the live video begins a predetermined amount of time prior to a time instance in which the first target event occurred. By temporarily buffering the live video, the computing device 102 is able to record or store the live video a predetermined amount of time prior to the time instance in which the first target event occurred. For some embodiments, the computing device 102 enhances the one or more makeup effects depicted in the recorded video by adjusting the colors of the makeup effects and/or adjusting the contrast levels of the colors associated with the makeup effects. If the computing device 102 detects that the first target event has occurred, the computing device 102 may also prompt the user to initiate playback of the recorded video.

At block 370, the computing device 102 detects an occurrence of a second target event relating to actions by the user. The second target event may comprise, for example, one or both eyes of the user being opened, the user's head being turned towards a field of view of a front facing camera of the computing device, and/or the user's eyes moving back inside a field of view of the front facing camera. Other examples of the second target event may include manipulation of a playback control in the user interface and/or a gesture performed by the user sensed by a front facing camera of the computing device where the second target events may be specified by the user.

At block 380, the computing device 102 stops recording of the live video responsive to the occurrence of the second target event. For some embodiments, the computing device 102 may be further configured to detect the occurrence of a second target event relating to actions by the user and in response to the occurrence of the second target event, perform playback of the recorded live video. Thereafter, the process in FIG. 3 ends.

Figure 4:
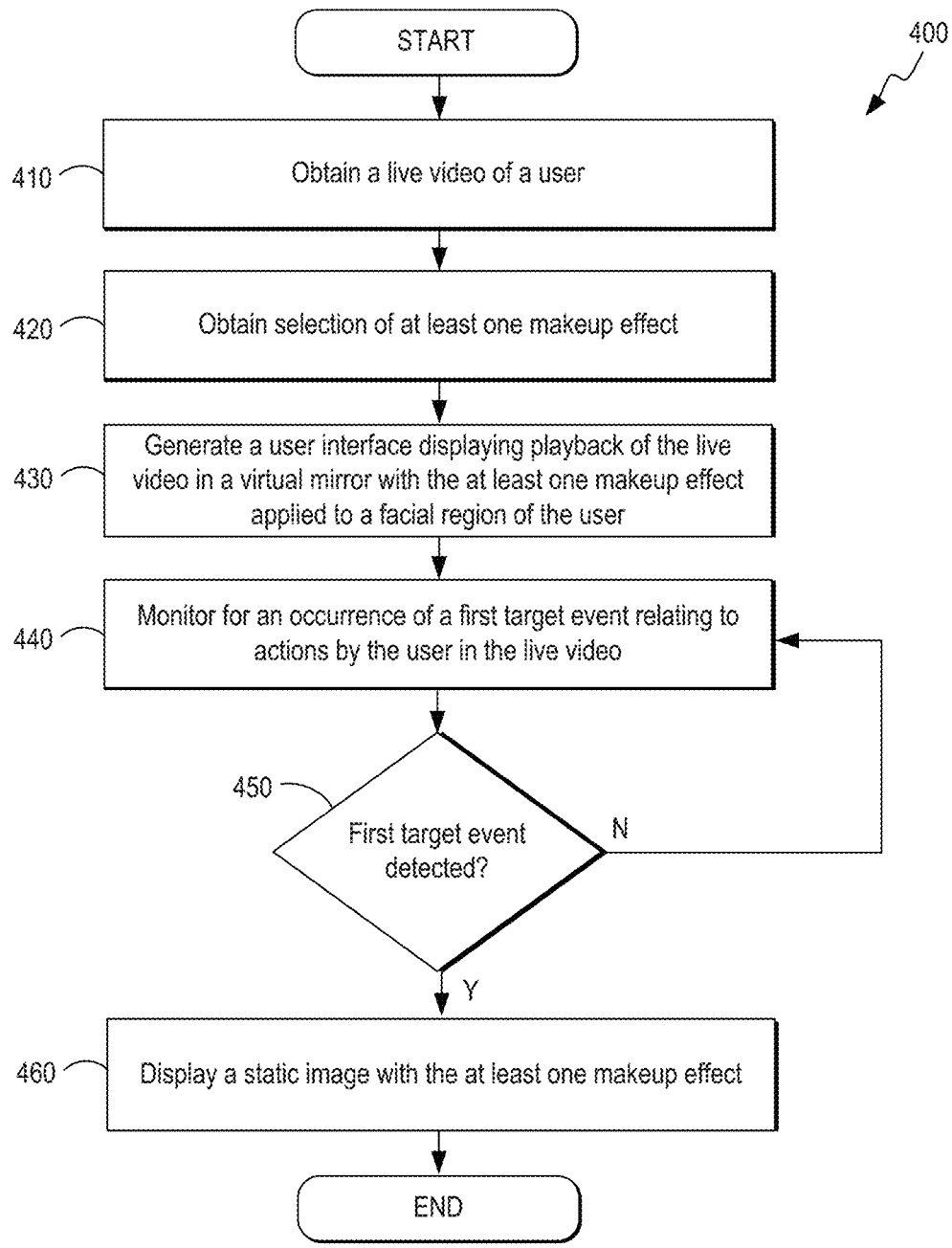
FIG. 4 is a top-level flowchart illustrating examples of functionality implemented as portions of the computing device of FIG. 1 for performing event-based playback control during virtual application of makeup effects according to an alternative embodiment.

Reference is made to FIG. 4, which is a flowchart 400 in accordance with an alternative embodiment for event-based playback control during virtual application of makeup effects performed by the computing device 102 of FIG. 1. It is understood that the flowchart 400 of FIG. 4 provides merely an example of the different types of functional arrangements that may be employed to implement the operation of the various components of the computing device 102.

As an alternative, the flowchart 400 of FIG. 4 may be viewed as depicting an example of steps of a method implemented in the computing device 102 according to one or more embodiments.

Although the flowchart 400 of FIG. 4 shows a specific order of execution, it is understood that the order of execution may differ from that which is displayed. For example, the order of execution of two or more blocks may be scrambled relative to the order shown. Also, two or more blocks shown in succession in FIG. 4 may be executed concurrently or with partial concurrence. It is understood that all such variations are within the scope of the present disclosure.

At block 410, the computing device 102 obtains a live video of a user, where the live video comprises a plurality of image frames of the user. At block 420, the computing device 102 obtains selection of at least one makeup effect. At block 430, the computing device 102 generates a user interface displaying playback of the live video in a virtual mirror with the at least one makeup effect applied to the facial region of the user. At block 440, the computing device 102 monitors for an occurrence of a first target event relating to actions by the user in the live video, where the first target event comprises one or both eyes of the user being closed, a head of the user being turned sideways with respect to a front facing camera of the computing device, and/or the eyes of the user moving outside a field of view of the front facing camera.

At decision block 450, if the first target event has not been detected, the computing device 102 continues to monitor the actions by the user in the live video (block 440). However, if the computing device 102 detects that the first target event has occurred, the computing device 102 displays a static image depicting the selected makeup effects applied to the facial region of the user. The static image is selected from one of the plurality of image frames of the live video after the occurrence of the first target event (block 460). The one or more makeup effects shown in the static image may be enhanced prior to being displayed by adjusting the colors of the makeup effects and/or adjusting the contrast levels of the colors associated with the makeup effects. If the computing device 102 detects that the first target event has occurred, the computing device 102 may also prompt the user to initiate playback of the recorded video.

For some embodiments, the computing device 102 may be further configured to record a video of the user with one or more selected makeup effects applied to the facial region of the user, where recording of the video occurs at a time instance when the first target event was detected. The computing device 102 may be further configured to detect an occurrence of a second target event relating to actions by the user and stop recording of the video responsive to occurrence of the second target event. The second target event may be specified by the user and may include, for example, one or both of the user's eyes being opened, the user's being turned towards a field of view of a front facing camera of the computing device, and/or the user's eyes moving inside a field of view of the front facing camera.

For some embodiments, the computing device 102 may be further configured to record a video of the user with one or more selected makeup effects applied to the facial region of the user, where recording of the video occurs at a time instance when the first target event was detected. The computing device 102 may be further configured to detect an occurrence of a second target event relating to actions by the user and in response to this, perform playback of the recorded video. In the context of this disclosure, the playback of the recorded video refers to time-shifted viewing of the recorded video. In particular, during the recording process, the user is able to begin viewing the recorded video without stopping the recording of the live video. The user may, for example, pause playback of the recorded video while the live video continues to be recorded, and the user may later resume playback.

The second target event may comprise manipulation of a playback control in the user interface. This may comprise, for example, the user pressing a play button control to initiate playback. Other second target events may include a gesture performed by the user sensed by a front facing camera of the computing device, one or both eyes of the user being opened, the user's head being turned towards a field of view of a front facing camera of the computing device, and/or the user's eyes moving inside a field of view of the front facing camera. Thereafter, the process in FIG. 4 ends.

Figure 5:
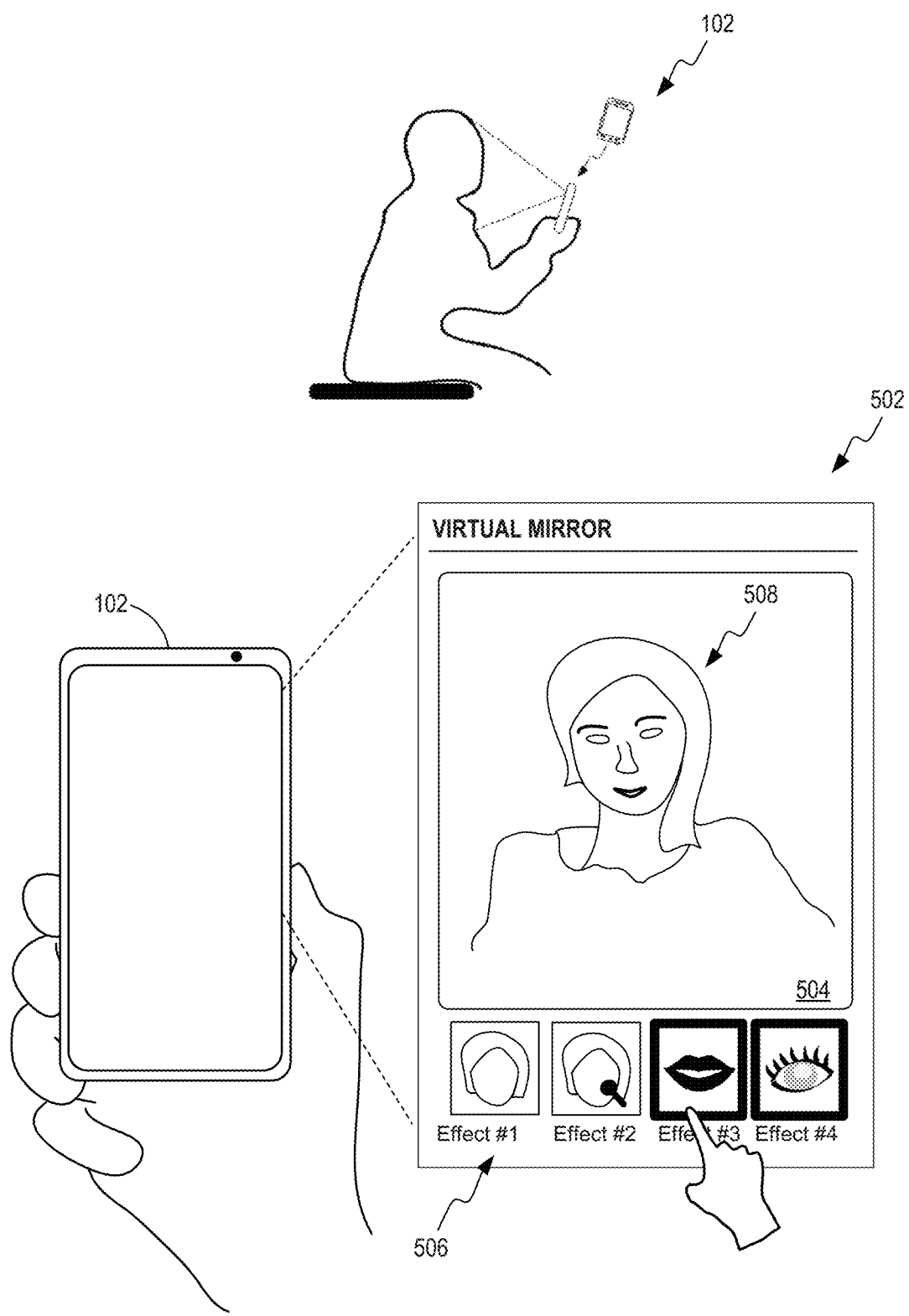
FIG. 5 illustrates an example user interface provided on a display of the computing device of FIG. 1 whereby a virtual mirror displays a live video of the user according to various embodiments of the present disclosure.

To further illustrate various aspects of the present invention, reference is made to the following figures. FIG. 5 illustrates an example user interface 502 provided on a display of the computing device 102 whereby a virtual mirror 504 displays a live video of the user. The user selects one or more makeup effects from the makeup effects toolbar 506 where the one or more selected makeup effects are virtually applied to the facial region 508 of the user. The event monitor 110 (FIG. 1) in the computing device 102 monitors the actions of the user depicted in the live video. Prior to the occurrence of a target event, the computing device 102 continuously displays live video of the user in the virtual mirror 504.

Figure 6:
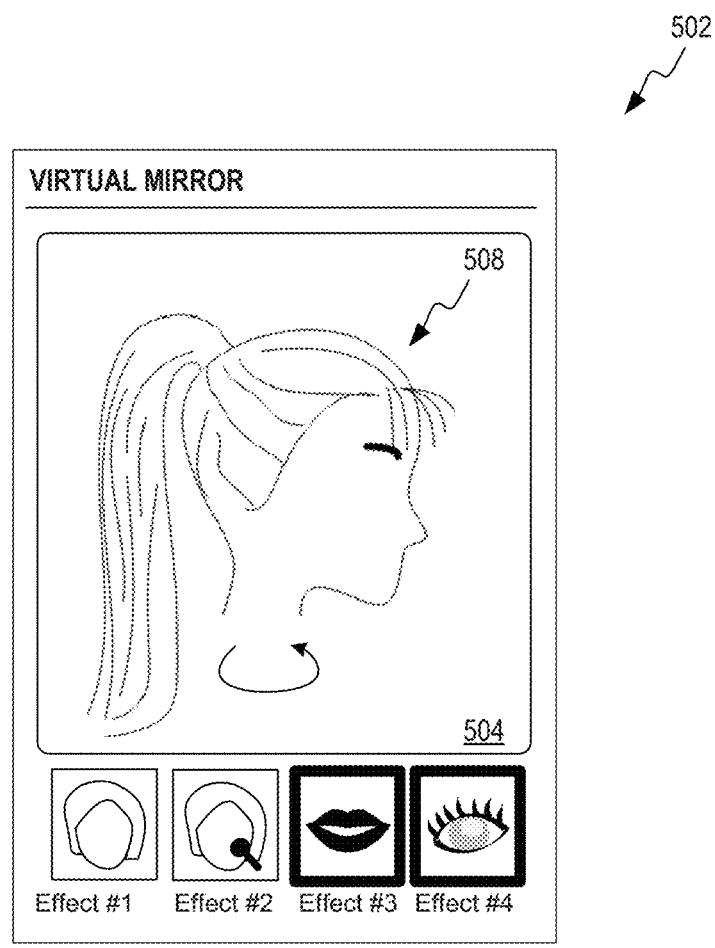
FIG. 6 illustrates an example where a first target event is detected by the computing device of FIG. 1 according to various embodiments of the present disclosure.

FIG. 6 illustrates an example where a target event is detected. In the example shown, the user turns her head sideways and is no longer looking at the front facing camera of the computing device 102. Assume for this example that the user turning her sideways was previously designated as a target event. Other examples of target events may include, for example, one or both of the user's eyes being closed or the user's eyes not being in the field of view of the front facing camera. Such target events may occur, for example, when the user turns away from the computing device 102 such that the back of her head is facing the front facing camera.

The event monitor 110 (FIG. 1) detects the occurrence of the target event. In response, playback of the live video being shown in the virtual mirror 504 is paused and a static image of the user with the one or more selected makeup effects applied is displayed at the time instance in which playback of the live video was paused. The video capture module 106 begins storing or buffering a video of the user with the selected makeup effect applied to the facial region of the user at the same time instance in which playback of the live video was paused.

Figure 7:
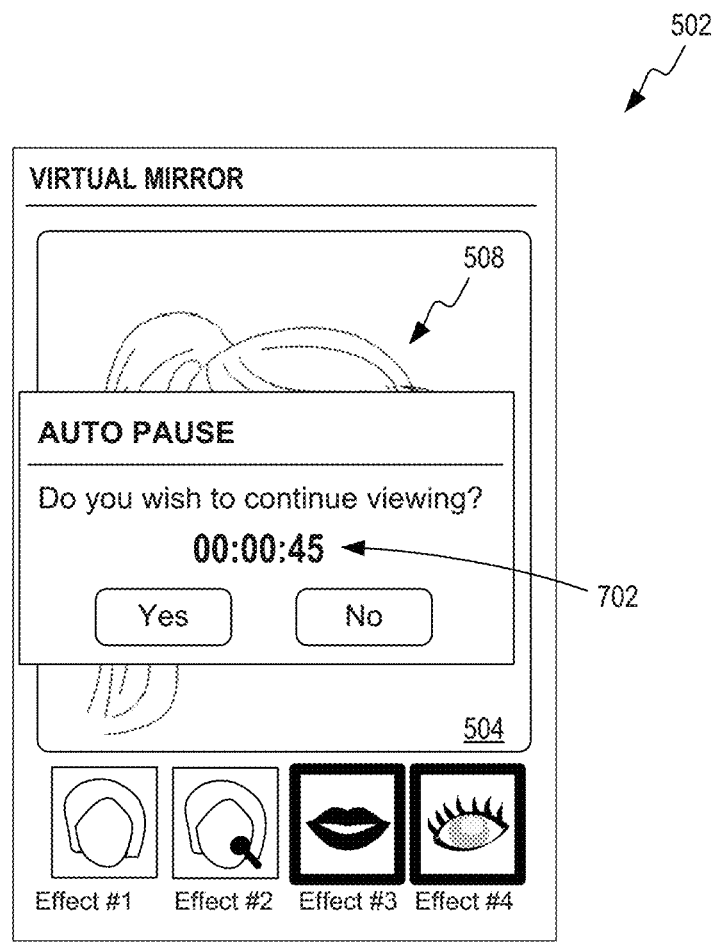
FIG. 7 illustrates an example where a second target event is detected and playback of the buffered video is performed by the computing device of FIG. 1 according to various embodiments of the present disclosure.

FIG. 7 illustrates playback of the buffered video. For some embodiments, once playback of the live video is paused, the computing device 102 alerts the user by displaying a prompt that allows the user to perform playback of the buffered video in the virtual mirror 504. For some embodiments, a timer 702 is shown to the user indicating the length of the buffered video. The user can either initiate playback of the buffered video or skip playback of the buffered video. If the user elects to skip playback of the buffered video, live video is again displayed in the virtual mirror 504.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A method implemented in a computing device, comprising:
obtaining a live video of a user, wherein the live video comprises a plurality of image frames of the user;
obtaining selection of at least one makeup effect;
generating a user interface displaying the live video in a virtual mirror with the at least one makeup effect applied to a facial region of the user;
monitoring for an occurrence of a first target event relating to actions by the user in the live video, wherein the first target event comprises at least one of:
one or both eyes of the user being closed;
a head of the user being turned sideways with respect to a front facing camera of the computing device; and
the eyes of the user moving outside a field of view of the front facing camera; and
responsive to detecting an occurrence of the first target event during the live video, performing the steps of:
recording the live video based on the occurrence of the first target event;
detecting an occurrence of a second target event relating to actions by the user; and
stopping recording of the live video responsive to the occurrence of the second target event.

2. The method of claim 1, wherein recording of the live video begins at a time instance in which the first target event occurred.

3. The method of claim 1, wherein recording of the live video begins a predetermined amount of time prior to a time instance in which the first target event occurred.

4. The method of claim 1, wherein the at least one makeup effect of the recorded video is enhanced by adjusting at least one of: colors; or contrast levels of the colors associated with the at least one makeup effect.

5. The method of claim 1, further comprising:
detecting an occurrence of a second target event relating to actions by the user; and
responsive to the occurrence of the second target event, performing playback of the recorded video.

6. The method of claim 5, wherein the second target event comprises at least one of:
manipulation of a playback control in the user interface;
a gesture performed by the user sensed by a front facing camera of the computing device;
one or both eyes of the user being opened;
a head of the user being turned towards a field of view of a front facing camera of the computing device; and
the eyes of the user moving inside a field of view of the front facing camera.

7. The method of claim 1, wherein the second target event is specified by the user.

8. The method of claim 1, further comprising:
responsive to detecting an occurrence of the first target event during playback of the live video, prompting the user to initiate playback of the recorded video.

9. A method implemented in a computing device, comprising:
obtaining a live video of a user, wherein the live video comprises a plurality of image frames of the user;
obtaining selection of at least one makeup effect;
generating a user interface displaying the live video in a virtual mirror with the at least one makeup effect applied to a facial region of the user;
monitoring for an occurrence of a first target event relating to actions by the user in the live video, wherein the first target event comprises at least one of:
one or both eyes of the user being closed;
a head of the user being turned sideways with respect to a front facing camera of the computing device; and
the eyes of the user moving outside a field of view of the front facing camera; and
responsive to detecting an occurrence of the first target event during the live video, displaying a static image with the at least one makeup effect applied to the facial region of the user, wherein the static image is selected from one of the plurality of image frames of the live video after the occurrence of the first target event.

10. The method of claim 9, wherein the at least one makeup effect of the static image is enhanced prior to being displayed by adjusting at least one of: colors; or contrast levels of the colors associated with the at least one makeup effect.

11. The method of claim 9, further comprising:
recording a video of the user with the selected at least one makeup effect applied to the facial region of the user, wherein recording the video begins at a time instance when the first target event was detected;
detecting an occurrence of a second target event relating to actions by the user; and
stopping recording of the video responsive to occurrence of the second target event.

12. The method of claim 11, further comprising:
responsive to detecting an occurrence of the first target event during playback of the live video, prompting the user to initiate playback of the recorded video.

13. The method of claim 11, wherein the second target event comprises at least one of:
one or both eyes of the user being opened;
a head of the user being turned towards a field of view of a front facing camera of the computing device; and
the eyes of the user moving inside a field of view of the front facing camera.

14. The method of claim 11, wherein the second target event is specified by the user.

15. The method of claim 9, further comprising:
recording a video of the user with the selected at least one makeup effect applied to the facial region of the user, wherein recording the video starts at a time instance when the first target event was detected;
detecting an occurrence of a second target event relating to actions by the user; and
responsive to the occurrence of the second target event, performing playback of the recorded video.

16. The method of claim 15, wherein the second target event comprises at least one of:
manipulation of a playback control in the user interface;
a gesture performed by the user sensed by a front facing camera of the computing device;
one or both eyes of the user being opened;
a head of the user being turned towards a field of view of a front facing camera of the computing device; and
the eyes of the user moving inside a field of view of the front facing camera.

17. A system, comprising:
a memory storing instructions;

a processor coupled to the memory and configured by the instructions to at least:
  obtain a live video of a user, wherein the live video comprises a plurality of image frames of the user;
  obtain selection of at least one makeup effect;
  generate a user interface displaying the live video in a virtual mirror with the at least one makeup effect applied to a facial region of the user;
  monitor for an occurrence of a first target event relating to actions by the user in the live video, wherein the first target event comprises at least one of:
    one or both eyes of the user being closed;
    a head of the user being turned sideways with respect to a front facing camera of the system; and
    the eyes of the user moving outside a field of view of the front facing camera; and
  responsive to detecting an occurrence of the first target event during the live video, the processor is further configured to:
    record the live video based on the occurrence of the first target event;
    monitor for an occurrence of a second target event relating to actions by the user; and
    stop recording of the live video responsive to the occurrence of the second target event.

18. The system of claim 17, wherein recording of the live video begins at a time instance in which the first target event occurred.

19. The system of claim 17, wherein the processor is further configured to:
  monitor for an occurrence of a second target event relating to actions by the user; and
  responsive to the occurrence of the second target event, perform playback of the recorded video.

20. The system of claim 17, wherein the processor is further configured to:
  responsive to detecting an occurrence of the first target event during playback of the live video, prompt the user to initiate playback of the recorded video.

21. A system, comprising:
  a memory storing instructions;
  a processor coupled to the memory and configured by the instructions to at least:
    obtain a live video of a user, wherein the live video comprises a plurality of image frames of the user;
    obtain selection of at least one makeup effect;
    generate a user interface displaying the live video in a virtual mirror with the at least one makeup effect applied to a facial region of the user;
    monitor for an occurrence of a first target event relating to actions by the user in the live video, wherein the first target event comprises at least one of:
      one or both eyes of the user being closed;
      a head of the user being turned sideways with respect to a front facing camera of the system; and
      the eyes of the user moving outside a field of view of the front facing camera; and
    responsive to detecting an occurrence of the first target event during the live video, displaying a static image with the at least one makeup effect applied to the facial region of the user, wherein the static image is selected from one of the plurality of image frames of the live video after the occurrence of the first target event.

22. The system of claim 21, wherein the processor is further configured to:
  record a video of the user with the selected at least one makeup effect applied to the facial region of the user, wherein recording the video begins at a time instance when the first target event was detected;
  monitor for an occurrence of a second target event relating to actions by the user; and
  stop recording of the video responsive to occurrence of the second target event.

23. The system of claim 21, wherein the processor is further configured to:
  record a video of the user with the selected at least one makeup effect applied to the facial region of the user, wherein recording the video starts at a time instance when the first target event was detected;
  monitor for an occurrence of a second target event relating to actions by the user; and
  responsive to the occurrence of the second target event, performing playback of the recorded video.

* * * * *